(12) United States Patent
Fulton et al.

(10) Patent No.: US 9,744,824 B2
(45) Date of Patent: Aug. 29, 2017

(54) DAMPING AIR SPRING AND SHOCK ABSORBER COMBINATION FOR HEAVY-DUTY VEHICLE AXLE/SUSPENSION SYSTEMS

(71) Applicant: HENDRICKSON USA, L.L.C., Itasca, IL (US)

(72) Inventors: R. Scott Fulton, Hudson, OH (US); Andrew J. Westnedge, Granville, OH (US); Thomas J. Long, Canton, OH (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 0 days.

(21) Appl. No.: 15/080,799

(22) Filed: Mar. 25, 2016

(65) Prior Publication Data

US 2016/0280033 A1    Sep. 29, 2016

Related U.S. Application Data

(60) Provisional application No. 62/137,866, filed on Mar. 25, 2015.

(51) Int. Cl.
*B60G 15/12* (2006.01)
*B60G 17/08* (2006.01)
(Continued)

(52) U.S. Cl.
CPC ............. *B60G 15/12* (2013.01); *B60G 9/003* (2013.01); *B60G 11/27* (2013.01); *B60G 17/08* (2013.01);
(Continued)

(58) Field of Classification Search
CPC ........ B60G 15/12; B60G 11/27; B60G 17/08; B60G 17/052; B60G 17/0521;
(Continued)

(56) References Cited

U.S. PATENT DOCUMENTS 1,516,004 A    4/1923   Eckrode et al.
2,827,283 A    3/1958   Browne et al.
(Continued)

FOREIGN PATENT DOCUMENTS

DE    102009051944 A1    11/2009
EP    0914976 A1    5/1999
(Continued)

OTHER PUBLICATIONS

EPO machine translation, EP 1464865 A2, Dec. 2003.*

*Primary Examiner* — Thomas J Williams
(74) *Attorney, Agent, or Firm* — Dureska & Moore, LLC; David P. Dureska; Brent L. Moore

(57) ABSTRACT

A damping air spring and shock absorber combination for heavy-duty vehicle axle/suspension systems includes a damping air spring and a shock absorber both operatively attached to the axle/suspension system. The damping air spring primarily provides damping to the axle/suspension system over a first range of frequencies. The shock absorber primarily provides damping to the axle/suspension system over a second range of frequencies. The first range of frequencies is from about 0.0 Hz to about 6.0 Hz and the second range of frequencies is from about 0.0 Hz to about 13.0 Hz.

13 Claims, 11 Drawing Sheets

(51) Int. Cl.
  *B60G 9/00* (2006.01)
  *B60G 11/27* (2006.01)
  *F16F 15/02* (2006.01)
  *F16F 9/05* (2006.01)

(52) U.S. Cl.
  CPC .............. *F16F 9/05* (2013.01); *F16F 15/022* (2013.01); *B60G 2202/152* (2013.01); *B60G 2202/242* (2013.01); *B60G 2202/30* (2013.01); *B60G 2300/02* (2013.01); *B60G 2300/026* (2013.01); *B60G 2500/10* (2013.01); *B60G 2500/114* (2013.01)

(58) Field of Classification Search
  CPC .......... B60G 2202/152; B60G 2202/24; B60G 2202/242; B60G 2300/02; B60G 2300/026
  USPC .................................................... 280/124.158
  See application file for complete search history.

(56) References Cited

U.S. PATENT DOCUMENTS

| | | |
|---|---|---|
| 2,984,476 A | 5/1961 | Turner |
| 3,190,635 A | 6/1965 | Wustenhagen et al. |
| 3,330,578 A | 7/1967 | Kress et al. |
| 3,782,753 A | 1/1974 | Sweet et al. |
| 4,493,481 A | 1/1985 | Merkle |
| 4,742,996 A | 5/1988 | Gold |
| 4,762,308 A | 8/1988 | Geno |
| 4,844,428 A | 7/1989 | Margolis et al. |
| 4,934,667 A | 6/1990 | Pees et al. |
| 5,234,203 A | 8/1993 | Smith |
| 5,366,048 A | 11/1994 | Watanabe et al. |
| 5,374,077 A | 12/1994 | Penzotti et al. |
| 5,382,006 A | 1/1995 | Arnold |
| 5,701,969 A | 12/1997 | Stephens |
| 5,859,692 A | 1/1999 | Ross, Jr. et al. |
| 5,954,316 A | 9/1999 | Voss |
| 6,386,524 B1 | 5/2002 | Levy et al. |
| 6,389,341 B1 | 5/2002 | Davis |
| 6,412,759 B1 | 7/2002 | Krauss |
| 6,715,744 B2 | 4/2004 | Bell |
| 7,140,601 B2 | 11/2006 | Nesbitt et al. |
| 7,147,236 B2 * | 12/2006 | Momiyama ............ B60G 7/001 267/40 |
| 7,900,941 B2 | 3/2011 | Lundmark |
| 8,540,222 B2 | 9/2013 | Westnedge et al. |
| 8,844,956 B2 | 9/2014 | Boler et al. |
| 9,157,529 B2 | 10/2015 | Westnedge et al. |
| 2006/0186586 A1 | 8/2006 | Soles et al. |
| 2011/0049774 A1 | 3/2011 | Naber |
| 2011/0115140 A1 | 5/2011 | Moulik et al. |
| 2012/0061887 A1 | 3/2012 | Westnedge et al. |
| 2012/0291626 A1 | 11/2012 | Westnedge et al. |
| 2014/0167337 A1 | 6/2014 | Ramsey et al. |

FOREIGN PATENT DOCUMENTS

| | | |
|---|---|---|
| EP | 1464865 A2 | 10/2004 |
| GB | 2333576 A | 7/1999 |
| WO | 9421487 | 9/1994 |
| WO | 2007062744 A1 | 6/2007 |
| WO | 2007104671 A1 | 9/2007 |
| WO | 2008094072 A1 | 7/2008 |

* cited by examiner

DAMPING AIR SPRING AND SHOCK ABSORBER COMBINATION FOR HEAVY-DUTY VEHICLE AXLE/SUSPENSION SYSTEMS

CROSS-REFERENCE TO RELATED APPLICATION

This application claims the benefit of U.S. Provisional Patent Application Ser. No. 62/137,866, filed Mar. 25, 2015.

BACKGROUND OF THE INVENTION

Field of the Invention

The invention relates generally to the art of axle/suspension systems for heavy-duty vehicles. More particularly, the invention relates to air-ride axle/suspension systems for heavy-duty vehicles which utilize a damping air spring to cushion the ride of the vehicle. More specifically, the invention is directed to the combination of a damping air spring utilized in conjunction with a shock absorber for heavy-duty vehicle air-ride axle/suspension systems, in which the damping air spring is optimized to aid in providing damping characteristics to the axle/suspension system at a selected frequency range, and the shock absorber is optimized to aid in providing damping to the axle/suspension system at a selected frequency range generally different from the frequency range damped by the damping air spring. The combination of the damping air spring and shock absorber working together supplement one another to provide optimized damping across the entire range of critical frequencies encountered by the axle/suspension system during operation, thereby increasing the soft ride characteristics of the axle/suspension system and extending the life of the components of the axle/suspension system, tires and other vehicle components, as well as potentially reducing weight of the axle/suspension system.

Background Art

The use of one or more air-ride trailing and leading arm rigid beam-type axle/suspension systems has been very popular in the heavy-duty truck, bus and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or its equivalent, which in turn is connected to a respective one of the main members. The air springs cushion the ride of the vehicle during operation, and in some cases, provide damping. A height control valve is mounted on the main member or other support structure and is operatively connected to the beam and to the air spring in order to maintain the ride height of the vehicle. A brake system and one or more shock absorbers also are mounted on the axle/suspension system. The shock absorbers provide damping to the axle/suspension system of the vehicle during operation. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of the forces.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces.

A key component of the axle/suspension system that cushions the ride of the vehicle from vertical impacts is the air spring, while a shock absorber typically provides damping characteristics to the axle/suspension system, although air springs with damping features have also been utilized.

The typical air spring without damping features of the type utilized in heavy-duty air-ride axle/suspension systems includes three main components: a flexible bellows, a piston and a bellows top plate. The bellows is typically formed from rubber or other flexible material, and is operatively mounted on top of the piston. The piston is typically formed from steel, aluminum, fiber reinforced plastic or other rigid material and is mounted on the rear end of the top plate of the beam of the suspension assembly by fasteners, which are generally well known in the art. The volume of pressurized air, or "air volume", that is contained within the air spring is a major factor in determining the spring rate of the air spring. More specifically, this air volume is contained within the bellows and, in some cases, the piston of the air spring. The larger the air volume of the air spring, the lower the spring rate of the air spring. A lower spring rate is generally more desirable in the heavy-duty vehicle industry because it provides a softer ride to the vehicle during operation. Typically, the piston either contains a hollow cavity, which is in communication with the bellows and which adds to the air volume of the air spring by allowing unrestricted communication of air between the piston and the bellows volumes, or the piston has a generally hollow cylindrical-shape and does not communicate with the bellows volume, whereby the piston does not contribute to the air volume of the air spring. The air volume of the air spring is in fluid communication with an air source, such as an air supply tank, and also is in fluid communication with the height control valve of the vehicle. The height control valve, by directing air flow into and out of the air spring of the axle/suspension system, helps maintain the desired ride height of the vehicle.

Prior art air springs such as the one described above, while providing cushioning to the vehicle, cargo and occupant(s) during operation of the vehicle, provide little, if any, damping to the axle/suspension system. Such damping is instead typically provided by a pair of hydraulic shock absorbers, although a single shock absorber has also been utilized and is generally well known in the art. The shock absorber typically includes a cylinder that is filled with fluid. A plunger with a diaphragm mounted on its end is disposed longitudinally within the fluid filled cylinder so that the plunger and diaphragm can move within the fluid filled cylinder. The diaphragm typically includes a number of openings and also includes a blow off valve that is mounted on the diaphragm. The blow off valve includes larger openings that allow a two-stage damping curve that is generally well known in the art. The shock absorber cylinder is mounted to the beam of a respective one of the suspension assemblies and the plunger is mounted to a respective one of the main members of the vehicle. As the beam is rotated upwardly toward the main member during operation of the vehicle, the plunger and diaphragm are moved downwardly through the fluid filled cylinder. As the beam is rotated downwardly away from the main member during operation of the vehicle, the plunger and diaphragm are moved upwardly through the fluid filled cylinder. The movement of the plunger and diaphragm through the fluid filled cylinder results in viscous damping of the axle/suspension system.

For trailers of heavy-duty vehicles, the frequencies where optimal damping of the axle/suspension system(s) is critical are from about 1.8 Hz, body bounce mode, to about 13 Hz, wheel hop mode. At these natural frequencies, the axle/suspension system is predisposed to move, so road inputs at these frequencies can result in a build-up of movement in the axle/suspension system that can potentially adversely affect the performance of the axle/suspension system.

Prior art shock absorbers have a continuously increasing damping curve at higher frequencies. This means that as the frequency of the inputs on the axle/suspension system increase, the damping provided by the shock absorber to the axle/suspension system is increased. This increased damping at higher input frequencies causes increased transmissibility of the forces acting on the axle/suspension system through the shock absorbers, which in turn can reduce the soft ride characteristics of the axle/suspension system at higher frequencies and can also lead to premature wear of the components of the axle/suspension system, tires and other vehicle components. The continuously increasing damping curve of the prior art shock absorbers can also potentially cause "misting" of the shock absorber. More specifically, misting occurs when fluid contained in the shock absorber is forced out around the plunger of the shock absorber during operation of the shock absorber. This occurs when high energy road inputs are imparted to the axle/suspension system through the wheels of the vehicle during operation of the vehicle. These high energy inputs on the axle/suspension system cause a larger damping force in the prior art shock absorber because of the continuously increasing damping curve of shock absorbers. This increased damping force in turn causes the shock absorber to generate very high internal pressures, which can cause the shock absorber to mist. Although misting of the shock absorber does not typically compromise the ability of the shock absorber to provide damping, misting can adversely affect components surrounding the shock absorber by contaminating them with fluid from the shock absorber and also may result in the belief that the shocks or other components have failed, when they have not, resulting in premature replacement of the shocks or other components which adds additional costs. Therefore, reducing the amount of misting of the shock absorber is preferred in order to minimize the possibility of contamination of surrounding components and premature replacement of the shocks or other vehicle components. In addition, the increased damping force of the prior art shock absorber at higher frequencies can cause increased stress to the components of the axle/suspension system that can in turn potentially increase wear and reduce the life of the components of the axle/suspension system, tires and other vehicle components.

The amount of cargo that a vehicle may carry is governed by local, state, and/or national road and bridge laws. The basic principle behind most road and bridge laws is to limit the maximum load that a vehicle may carry, as well as to limit the maximum load that can be supported by individual axles. Because standard prior art shock absorbers are relatively heavy, these components add undesirable weight to the axle/suspension system and therefore reduce the amount of cargo that can be carried by the heavy-duty vehicle. Depending on the shock absorbers employed, they also add varying degrees of complexity to the axle/suspension system, which is also undesirable.

Air springs with damping features, such as the one described in U.S. Pat. No. 8,540,222 owned by the assignee of the present application, are also known. The air spring with damping features shown and described in the '222 patent can be incorporated into axle/suspension systems, such as the one described above, and includes a bellows and a piston. The top end of the bellows is sealingly engaged with a bellows top plate. An air spring mounting plate is mounted on the top portion of the top plate by fasteners, which are also used to mount the top portion of the air spring to a respective one of the main members of the vehicle. The piston is generally cylindrical-shaped and includes a continuous generally stepped sidewall attached to a generally flat bottom plate and integrally formed with a top plate. The piston bottom plate is formed with a central opening. A fastener is disposed through the opening in order to attach the piston to the beam top plate at the rear end of the beam.

The top plate, sidewall and bottom plate of the piston define a piston chamber having an interior volume. The piston top plate is formed with a circular upwardly extending protrusion having a lip around its circumference. The lip cooperates with the lowermost end of the bellows to form an airtight seal between the bellows and the lip. Alternate means of attachment are also known and are commonly used in the art. The bellows, top plate and piston top plate define a bellows chamber having an interior volume. The piston top plate is formed with a pair of openings, which allow the volume of the piston chamber and the volume of the bellows chamber to communicate with one another. The piston chamber volume, the bellows chamber volume and the cross-sectional area of the openings formed in the piston top plate between the piston chamber and the bellows chamber provide damping characteristics to the air spring during operation of the vehicle.

Other prior art air springs have attempted to provide damping characteristics to the air spring by placing valves between the bellows and piston chambers of the air spring. Still other prior art air springs have attempted to provide damping characteristics to the air spring by forming an opening between the bellows and piston chambers of the air spring which is partially covered by rubber flaps mounted adjacent to the opening.

These prior art air springs with damping features may potentially provide less than optimal damping at higher frequencies above about 5 Hz, which can in turn potentially cause reduced life of the components of the axle/suspension system, including potentially increased tire wear and payload damage.

The combination damping air spring and shock absorber of the present invention overcomes the problems associated with prior art damping air springs and shock absorbers utilized with non-damping air springs, by providing an optimized damping air spring that is utilized in combination with an optimized shock absorber resulting in improved damping characteristics for the axle/suspension system across the entire spectrum of critical input frequencies. The combination damping air spring and shock absorber for heavy-duty vehicles allows tuning of certain structural components of the shock absorber to provide optimal damping at higher frequencies, resulting in improved damping to the axle/suspension system while reducing transmissibility of forces and misting that are common in prior art standard shock absorbers, saving weight and cost, and enabling the heavy-duty vehicle to haul more cargo. Moreover, reducing transmissibility of road inputs into the components of the axle/suspension system during operation of the vehicle increases the durability of the axle/suspension system and the components of the axle/suspension system, while maintaining the soft ride characteristics of the axle/suspension system at higher critical input frequencies. In addition, the damping air spring provides optimal damping at lower frequencies below about 5 Hz, which in turn increases the life of components of the axle/suspension system, tires and other vehicle components.

SUMMARY OF THE INVENTION

Objectives of the present invention include providing a damping air spring and shock absorber combination for heavy-duty vehicle axle/suspension systems that optimizes damping across the entire range of critical frequencies encountered by the axle/suspension system during operation.

A further objective of the present invention is to provide a damping air spring and shock absorber combination for heavy-duty vehicle axle/suspension systems that allows tuning of certain structural components of the shock absorber to provide optimal damping at higher frequencies, resulting in improved damping to the axle/suspension system while reducing transmissibility of forces and misting that are common in prior art standard shock absorbers.

Yet another objective of the present invention is to provide a damping air spring and shock absorber combination for heavy-duty vehicle axle/suspension systems that reduces weight and costs, and enables the heavy-duty vehicle to haul more cargo.

Still another objective of the present invention is to provide a damping air spring and shock absorber combination for heavy-duty vehicle axle/suspension systems that reduces transmissibility of road inputs into the components of the axle/suspension system during operation of the vehicle, which increases the durability of the axle/suspension system and the components of the axle/suspension system while maintaining the soft ride characteristics of the axle/suspension system at higher critical input frequencies.

An even further objective of the present invention is to provide a damping air spring and shock absorber combination for heavy-duty vehicle axle/suspension systems whereby the damping air spring provides optimal damping at lower frequencies, below about 5 Hz, which in turn increases the life of components of the axle/suspension system, tires and other vehicle components.

These objectives and advantages are obtained by the damping air spring and shock absorber combination for heavy-duty vehicle axle/suspension systems of the present invention which includes a damping air spring operatively attached to the axle/suspension system, and a shock absorber operatively attached to the axle/suspension system. The damping air spring primarily provides damping to the axle/suspension system over a first critical range of frequencies and the shock absorber primarily provides damping to the axle/suspension system over a second range of critical frequencies. The first range of critical frequencies and the second range of critical frequencies are different from one another.

BRIEF DESCRIPTION OF THE SEVERAL VIEWS OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

Figure 3:
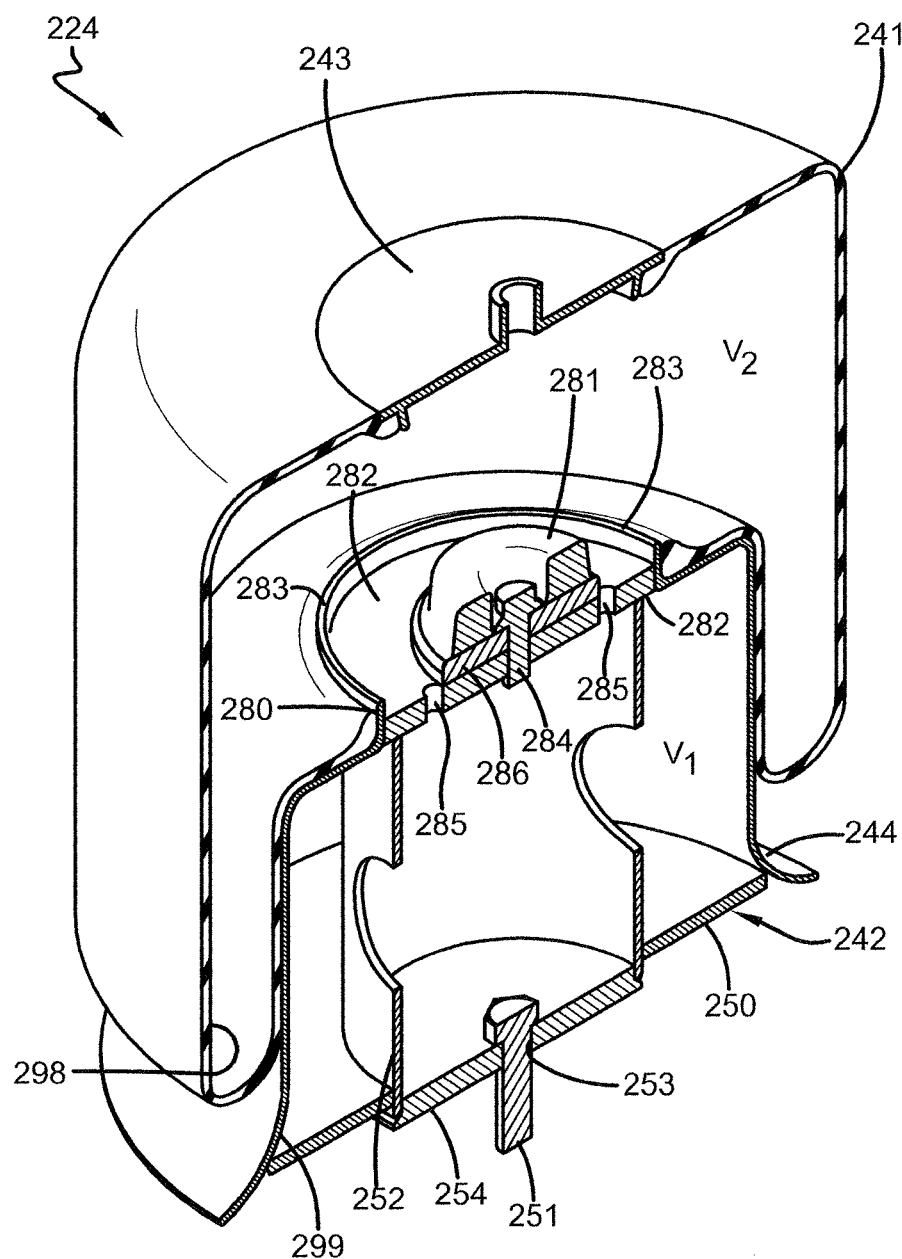
FIG. 3 is a perspective view of a prior art air spring with damping features, in section, showing the openings formed in the piston top plate between and communicating with the piston chamber and the bellows chamber, and also showing a bumper attached to the top plate of the piston.
Figure 5:
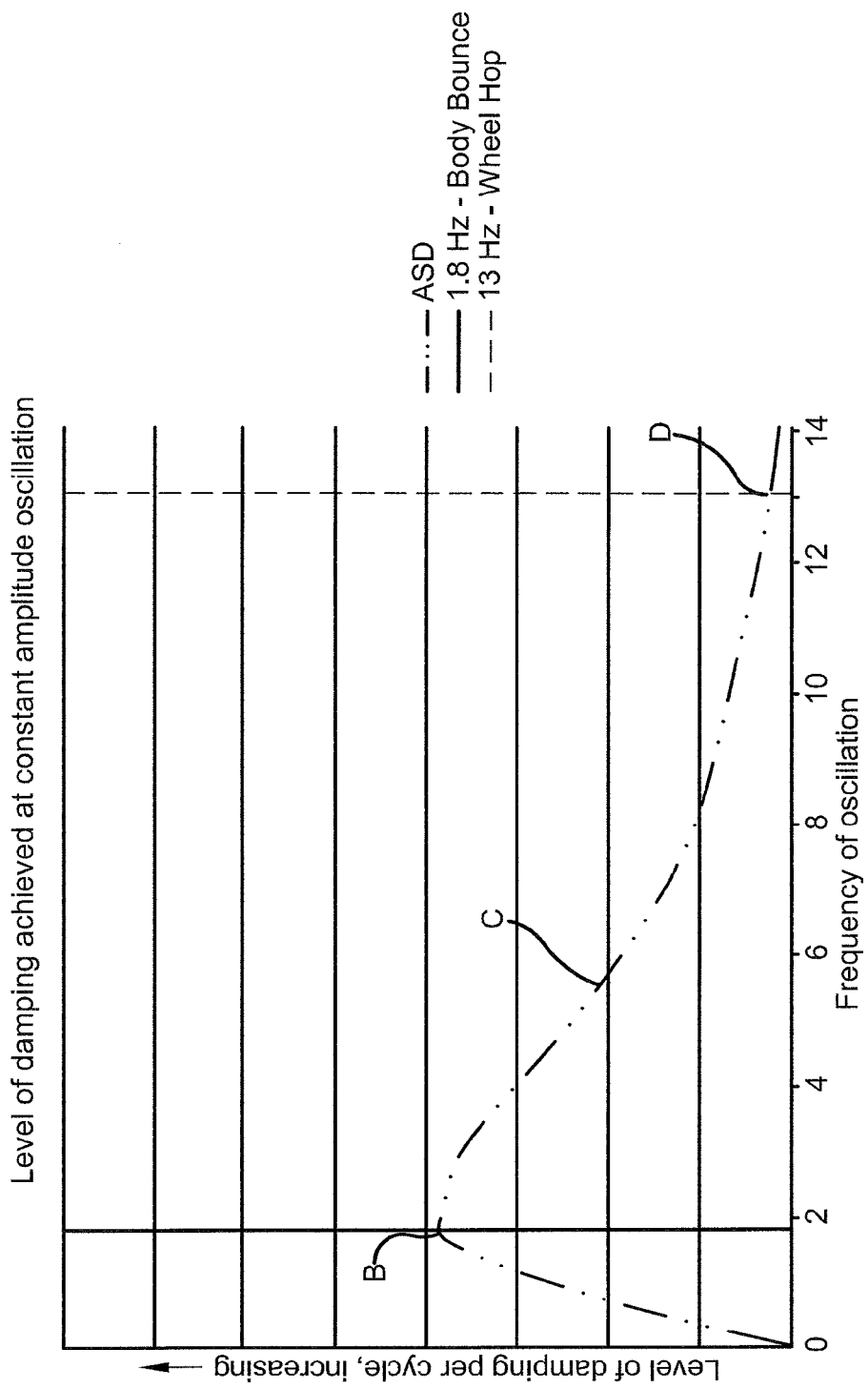
Figure 6:
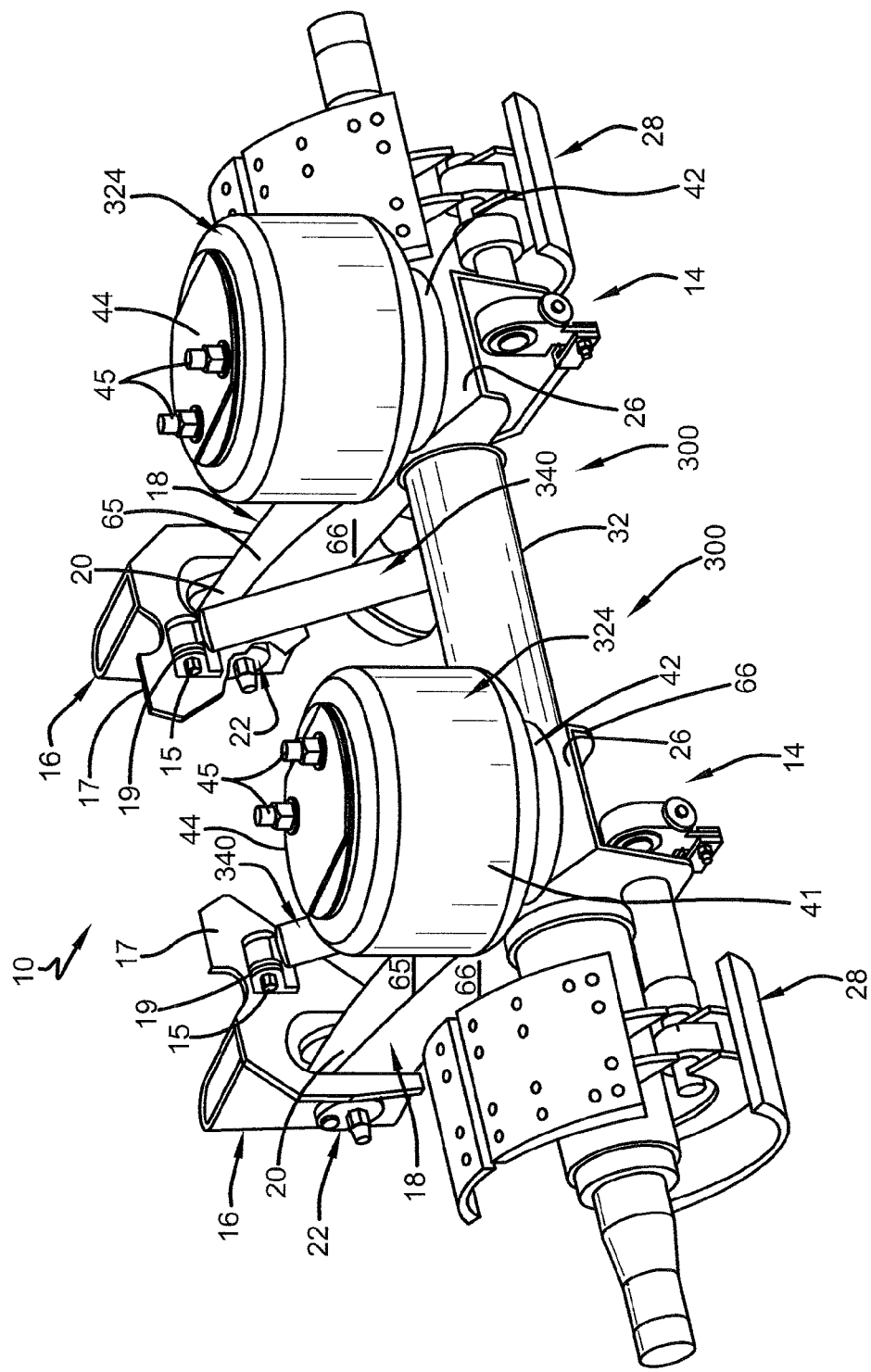
Figure 7:
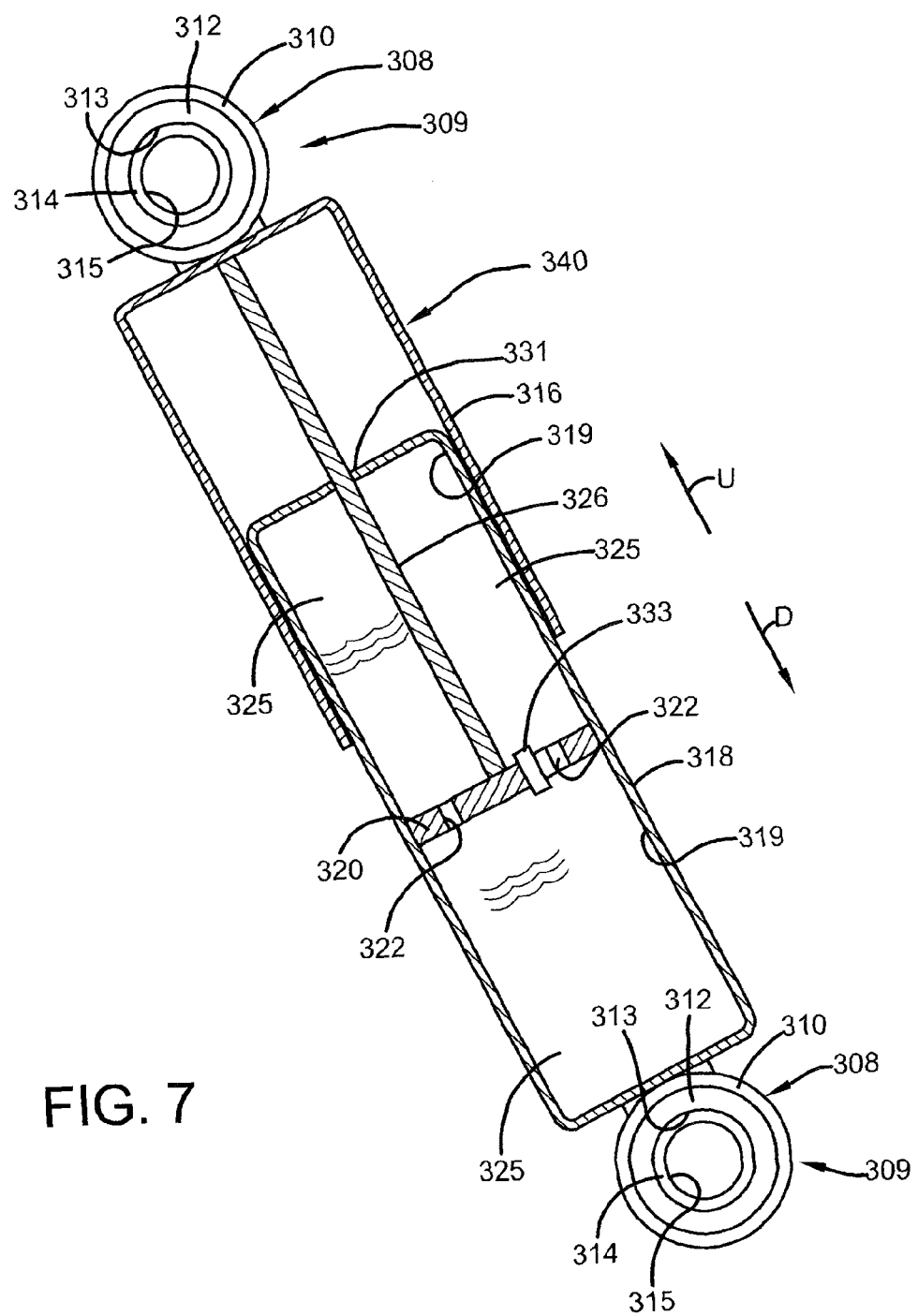
Figure 8:
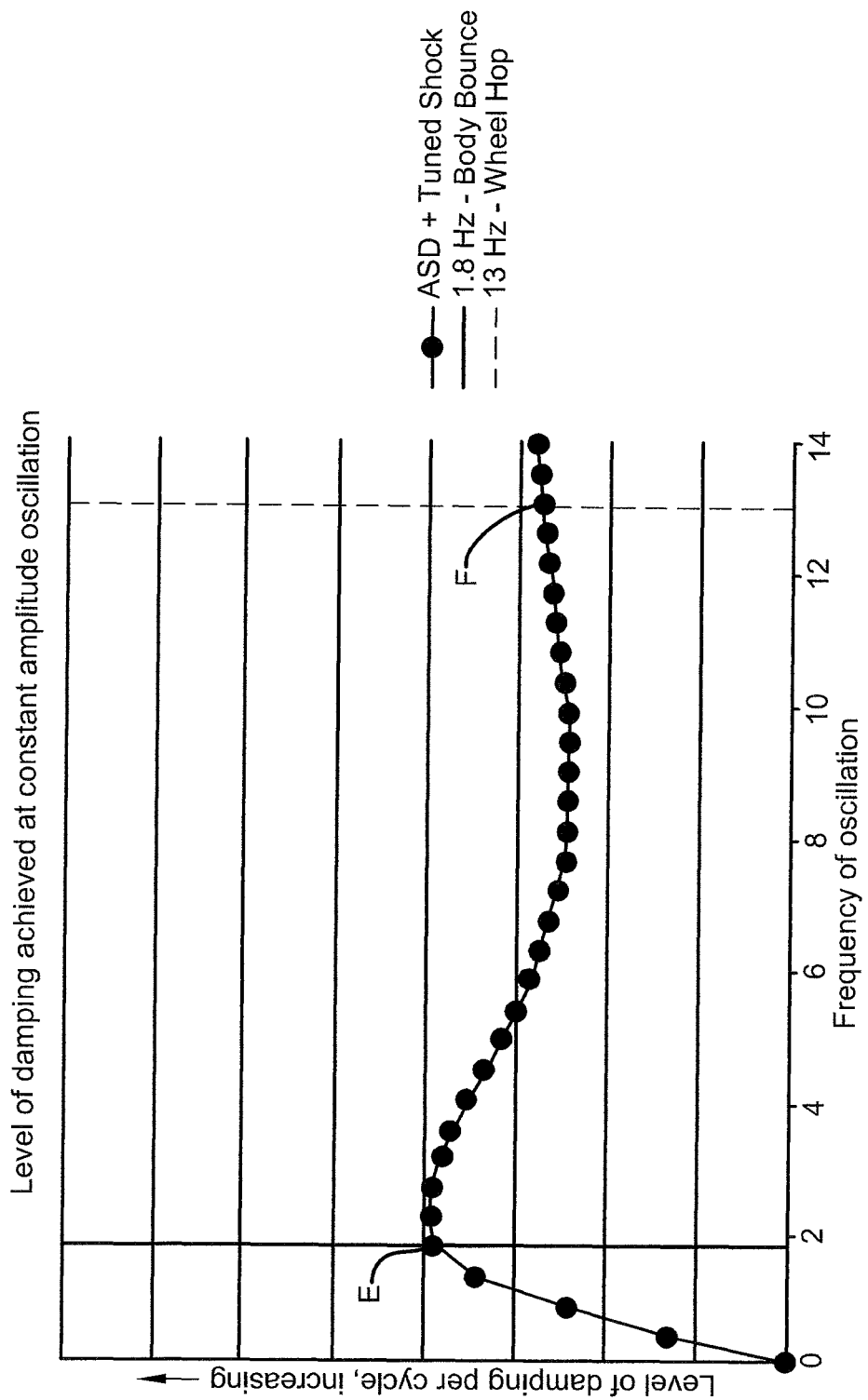
Figure 9:
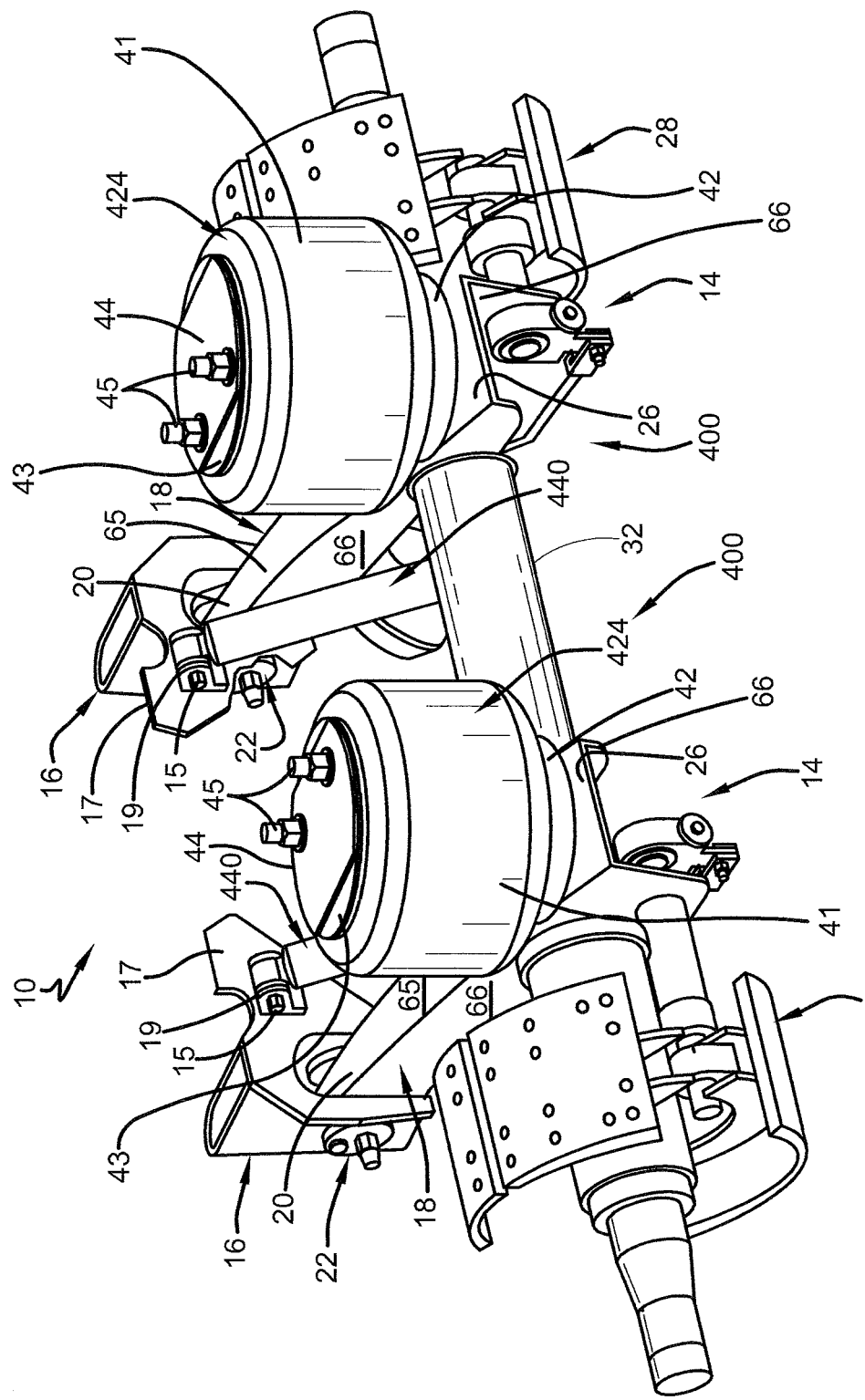
Figure 10:
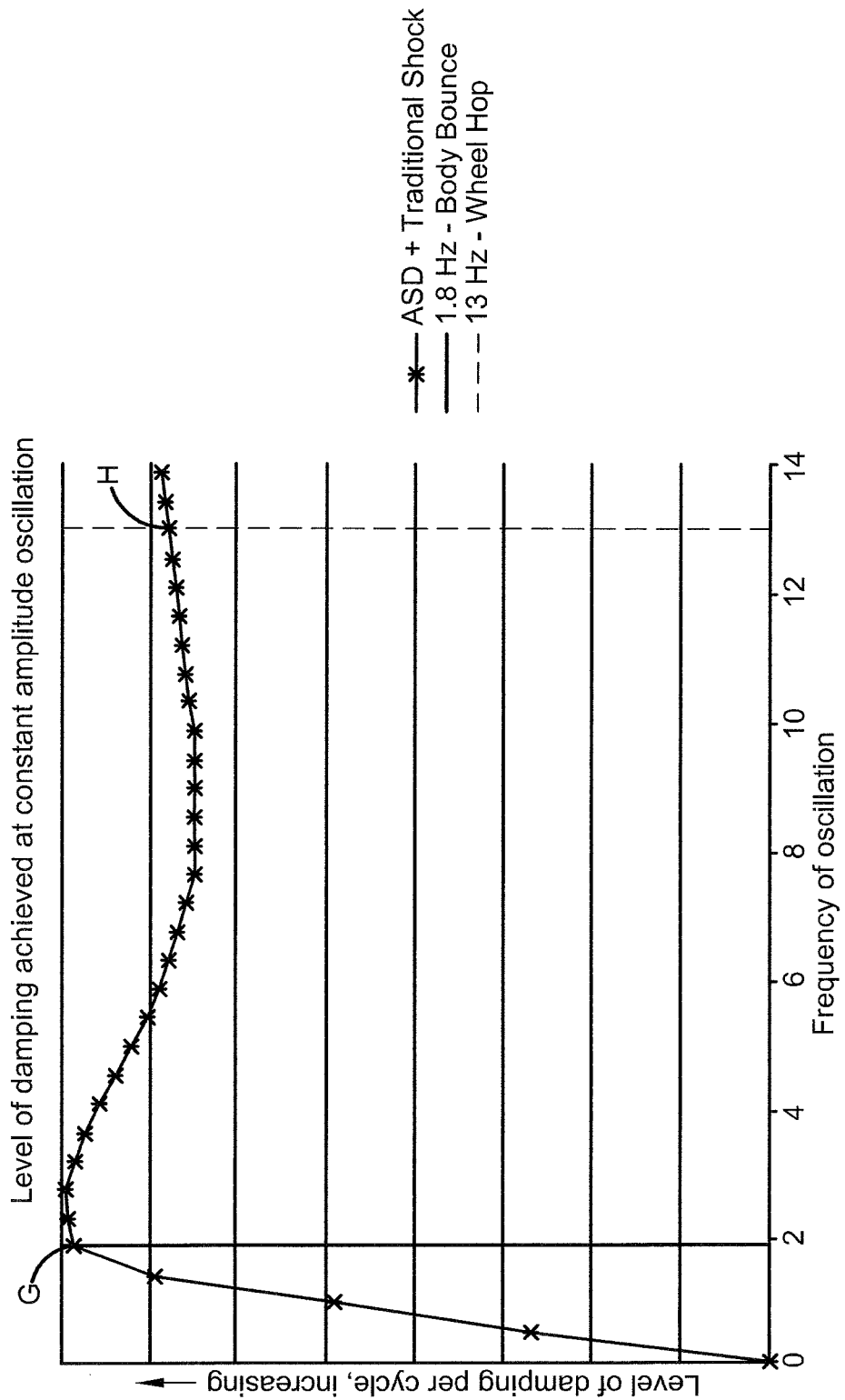
Figure 11:
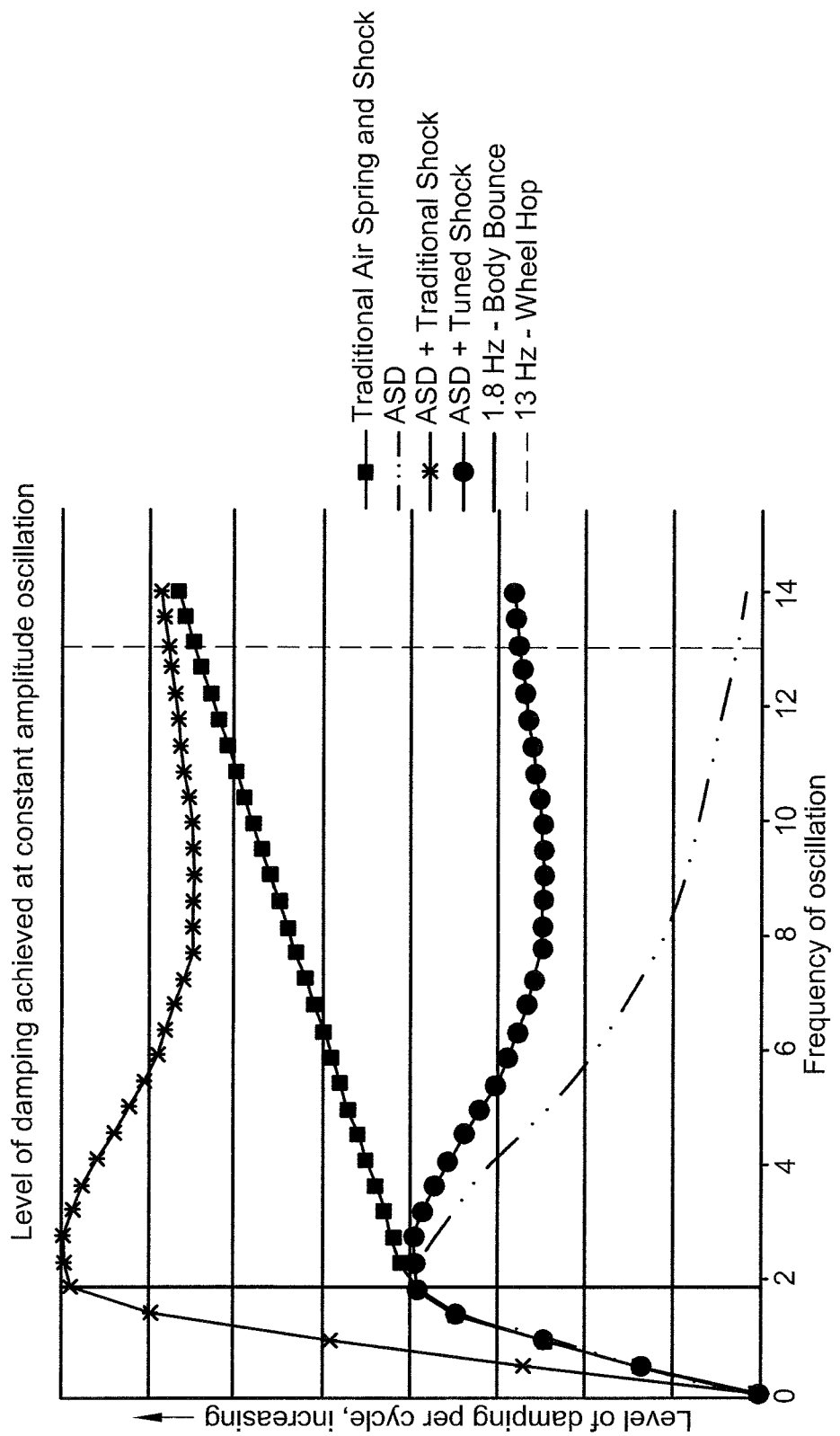

FIG. 5 is a graph showing the relative level of damping per cycle over a critical range of frequencies of an axle/suspension system incorporating the damping air spring shown in FIG. 3, without using a shock absorber;

FIG. 6 is a perspective view of an axle/suspension system incorporating a first preferred embodiment combination optimized damping air spring and optimized shock absorber of the present invention;

FIG. 7 is a schematic cross-sectional view of the optimized shock absorber shown in FIG. 6, showing the plunger extending into the lower portion of the shock absorber and attached to a diaphragm that includes a pair of openings with the blow off valve optimized;

FIG. 8 is a graph showing the relative level of damping per cycle over a critical range of frequencies of the axle/suspension incorporating the first preferred embodiment combination optimized damping air spring and optimized shock absorber of the present invention shown in FIG. 6;

FIG. 9 is a perspective view of an axle/suspension system incorporating a second preferred embodiment combination optimized damping air spring and traditional shock absorber of the present invention;

FIG. 10 is a graph showing the relative level of damping per cycle over a critical range of frequencies of the axle/suspension system incorporating the second preferred embodiment combination optimized damping air spring and traditional shock absorber of the present invention shown in FIG. 8; and FIG. 11 is a graph comparing the relative level of damping per cycle over a critical range of frequencies of the axle/suspension systems shown above in the graphs in FIGS. 4, 5, 8 and 10. Similar numerals refer to similar parts throughout the drawings.

DESCRIPTION OF THE PREFERRED EMBODIMENT

Figure 1:
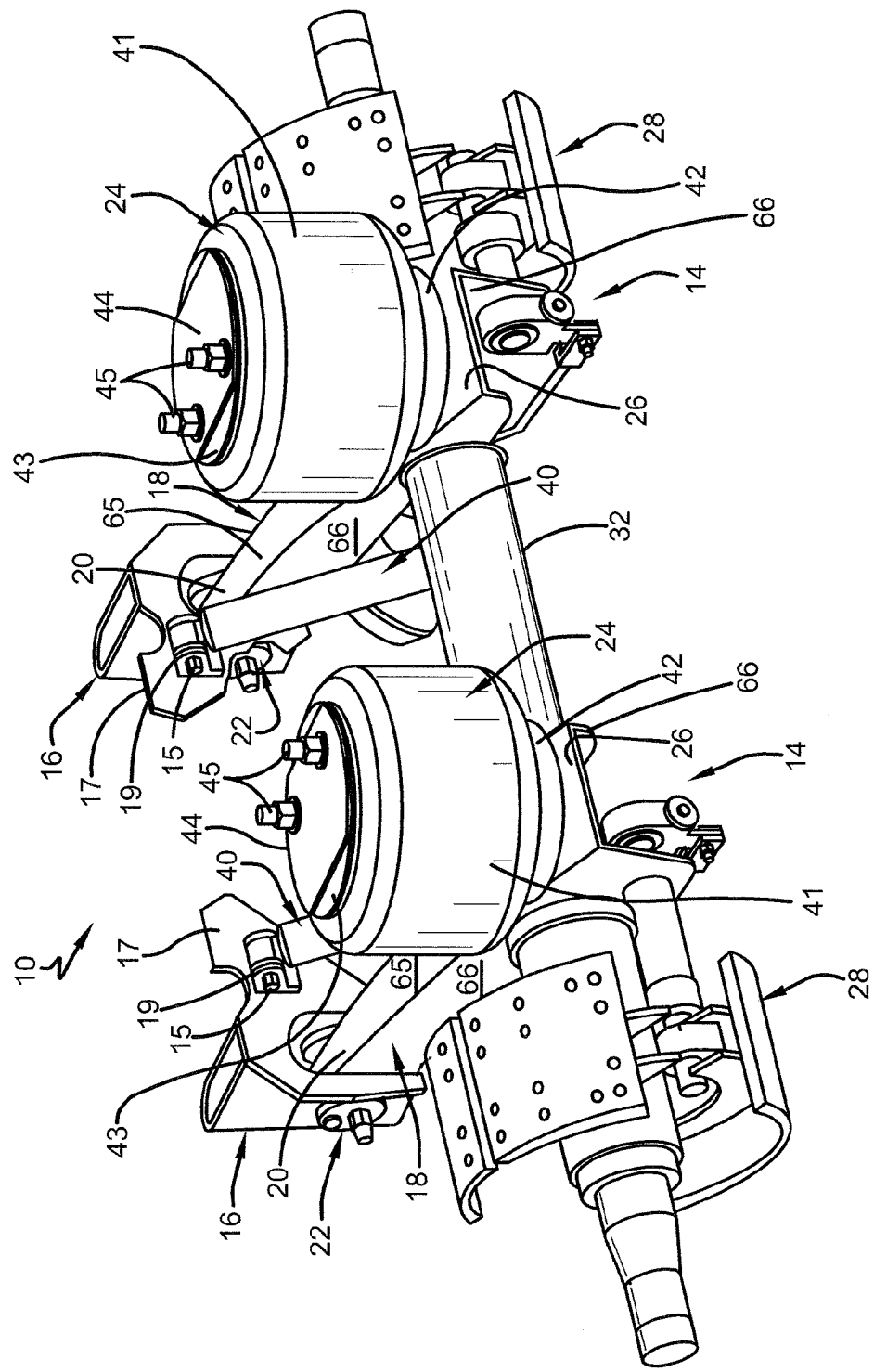
FIG. 1 is a top rear perspective view of an axle/suspension system incorporating a pair of prior art non-damping air springs, and showing a pair of shock absorbers, with each one of the pair of shock absorbers mounted on a respective one of the suspension assemblies of the axle/suspension system.

In order to better understand the environment in which the combination damping air spring and shock absorber for a heavy-duty vehicle of the present invention is utilized, a trailing arm overslung beam-type air-ride axle/suspension system that incorporates a prior art non-damping air spring 24, is indicated generally at 10, is shown in FIG. 1, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity and conciseness only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate (not shown) extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely extending axle 32.

Suspension assembly 14 also includes air spring 24, mounted on and extending between beam rear end 26 and the main member (not shown). Air spring 24 includes a bellows 41 and a piston 42. The top portion of bellows 41 is sealingly engaged with a bellows top plate 43. An air spring mounting plate 44 is mounted on top plate 43 by fasteners 45, which are also used to mount the top portion of air spring 24 to the vehicle main member (not shown). Alternate means for mounting top plate 43 to the vehicle main member, such as direct attachment, via fasteners or welds, are also generally well known in the art. Piston 42 is generally cylindrical-shaped and has a generally flat bottom plate and top plate (not shown). The bottom portion of bellows 41 is sealingly engaged with piston top plate (not shown). The piston bottom plate rests on beam top plate 65 at beam rear end 26 and is attached thereto in a manner well known to those having skill in the art, such as by fasteners or bolts (not shown). The piston top plate is formed without openings so that there is no fluid communication between piston 42 and bellows 41. As a result, piston 42 does not generally contribute any appreciable volume to air spring 24. The top end of a shock absorber 40 is mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and which also is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 24 cushions the ride of the vehicle for cargo and passengers while shock absorber 40 assists in controlling the ride of the vehicle.

Figure 2:
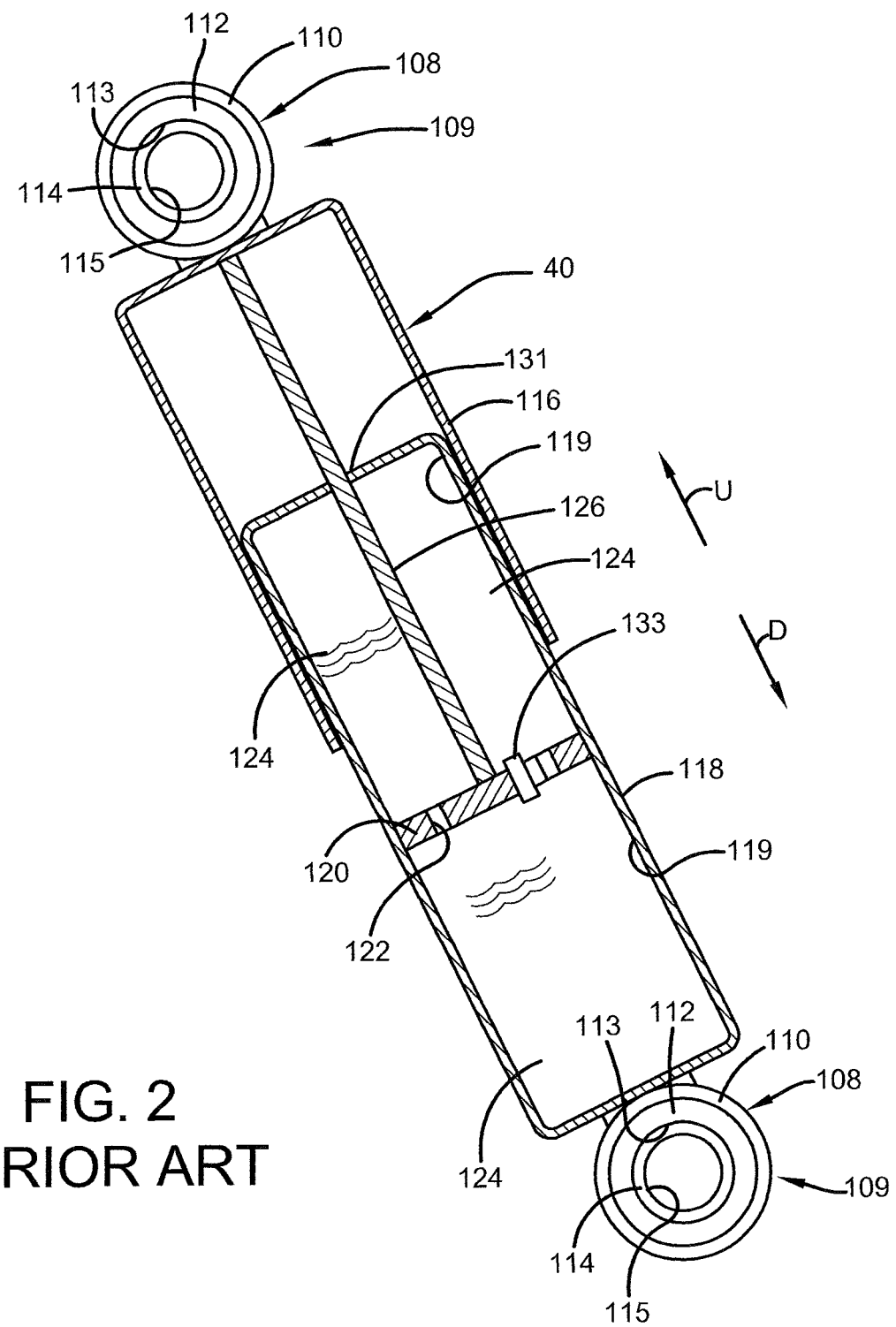
FIG. 2 is a schematic cross-sectional view of the prior art shock absorber shown in FIG. 1, showing the plunger extending into the lower portion of the shock absorber and attached to a diaphragm that includes a pair of openings and a blow off valve, and showing the cylinder of the shock absorber filled with fluid.

Turning now to FIG. 2, prior art shock absorber 40 includes an upper inverted cup portion 116 that is slip fit over cylinder 118. An eyelet 109 including a bushing assembly 108 is mounted on the lowermost end of the shock absorber cylinder 118 and also on the uppermost end of inverted cup portion 116. More specifically, bushing assembly 108 includes an outer generally cylindrical carrier 110 formed from metal or other sufficiently rigid material. A bushing 112 formed with a continuous opening 113 at its center is press fit into cylindrical carrier 110. An inner sleeve 114 having a generally cylindrical shape and formed with a continuous opening 115 at its center is press fit into opening 113 of bushing 112. Inner sleeve 114 extends generally outwardly past bushing 112 and carrier 110. Carrier 110 is fixedly attached to the uppermost end of a plunger 126, via welds or other similar means of rigid attachment. Cylinder 118 includes a chamber 119, which is filled with fluid 124. Chamber 119 also includes a generally circular flat diaphragm 120 formed with a pair of openings 122 that allow communication of fluid through the diaphragm and within or throughout the entire chamber. The uppermost surface of diaphragm 120 is attached to plunger 126. Plunger 126 extends from diaphragm 120, through chamber 119 and fluid 124, through an opening 131 formed in the uppermost portion of cylinder 118, and is attached to the inner surface of inverted cup 116 and carrier 110 as set forth above. As inverted cup portion 116 slides downwardly over cylinder 118 of shock absorber 40 during operation of the vehicle, plunger 126 moves diaphragm 120 downwardly in direction D. Conversely, as inverted cup portion 116 slides upwardly over lower portion 118 of shock absorber 40 during operation of the vehicle, plunger 126 moves diaphragm 120 upwardly in direction U. The upward and downward movement of diaphragm 120 provides viscous damping to shock absorber 40 and in turn, the axle/suspension system to which it is attached during operation of the heavy-duty vehicle. A blow off valve 133 is located on diaphragm 120. Blow off valve 133 provides controlled relief of peak pressures on either side of diaphragm 120 in the cylinder chamber 119 resulting from movement of the diaphragm through fluid 124 contained in the cylinder chamber. Blow off valve 133 is activated during high energy load inputs, thereby reducing the pressure inside cylinder chamber 119 and reducing the rate of increase of damping within shock absorber 40. Conversely, blow off valve 133 typically remains closed for low energy inputs.

Prior art air spring 24 described above, has very limited or no damping capabilities because its structure, as described above, does not provide for the same. Instead, prior art air spring 24 relies on shock absorber 40 to provide damping to axle/suspension system 10.

Figure 4:
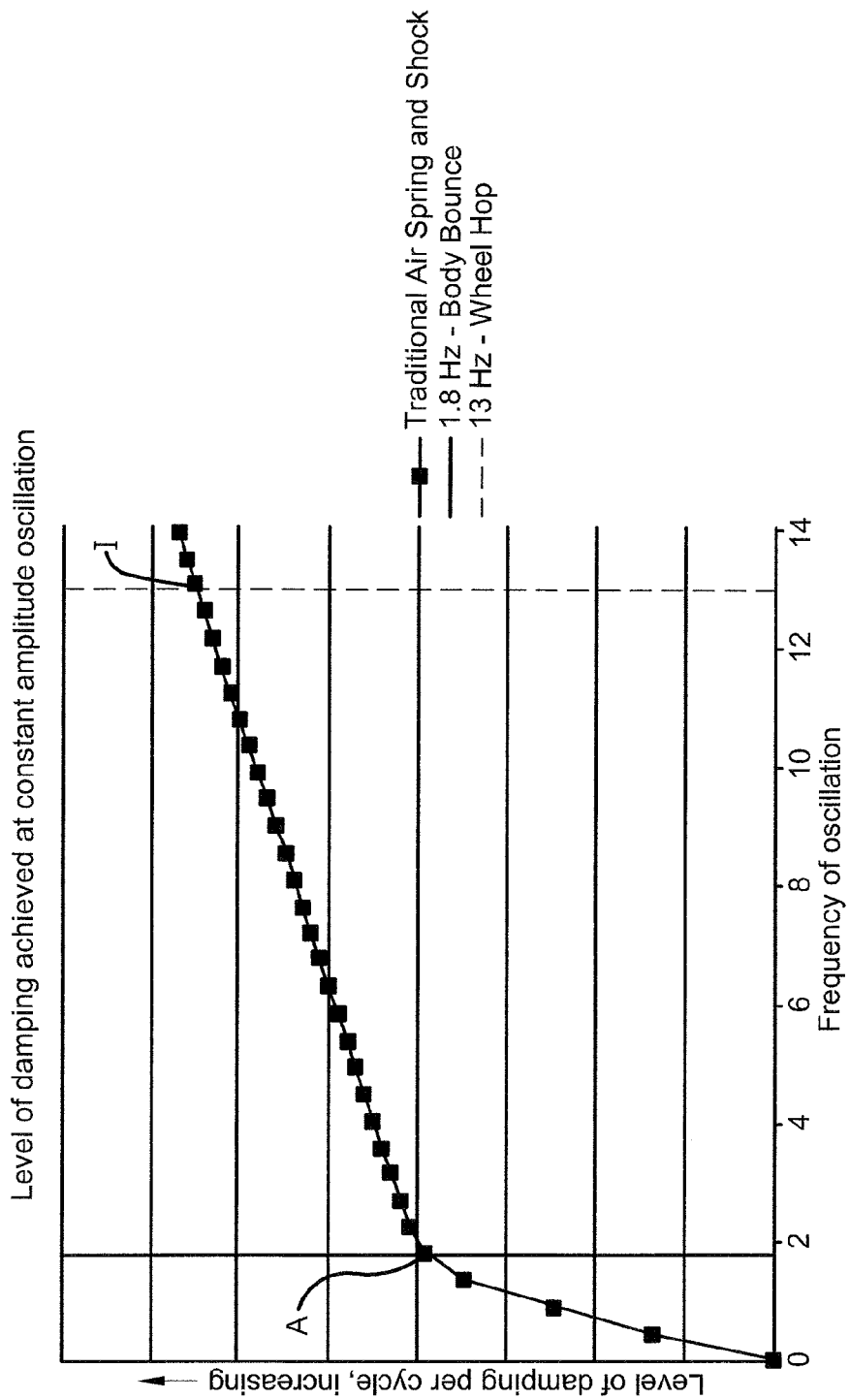
FIG. 4 is a graph showing the relative level of damping per cycle over a critical range of frequencies of an axle/ suspension system incorporating the prior art non-damping air spring and shock absorber shown in FIG. 1.

Turning now to FIG. 4, the relative level of damping per cycle of axle/suspension system 10, shown in FIG. 1, plotted over a critical range of frequencies is shown. In this prior art arrangement, shock absorber 40 is relied upon as the only means for providing damping features to axle/suspension system 10. Because of this, axle/suspension system 10 utilizing shock absorber 40 in combination with a typical prior art air spring 24 without damping features generally provides optimal damping at point A, at about 1.8 Hz. At higher frequencies, between about 12.0 Hz.-14.0 Hz at point I, axle/suspension system 10 is subjected to increased damping as a result of the continuously increasing damping curve of typical prior art shock absorber 40. The increased damping of shock absorber 40 causes increased transmissibility of the forces acting on the axle/suspension system, which in turn can reduce the soft ride characteristics of the axle/suspension system and can lead to premature wear of the components of the axle/suspension system, tires and other vehicle components. This increased damping demonstrated by prior art shock absorber 40 of axle/suspension system 10 can also potentially cause misting of the shock absorber when it encounters high energy inputs as described previously, which can adversely affect components surrounding the shock absorber by contaminating them with fluid from the shock absorber and can also result in premature replacement of the shock absorbers or surrounding components. In addition, the increased damping of prior art shock absorber 40 requires large and heavy mounts for effective transmission of the forces acting on the shock absorber through the axle/suspension system during operation of the vehicle, which undesirably increase weight of the vehicle, and in turn increases cost to operate the vehicle due to increased fuel consumption.

A prior art air spring with damping features is shown generally at 224 in FIG. 3, is used in conjunction with an axle of an axle/suspension system having a gross axle weight rating (GAWK) of about 20,000 lbs., is the subject of U.S. Pat. No. 8,540,222 and will be described in detail below. Like prior art air spring 24 described above, air spring 224 is also incorporated into axle/suspension system 10, or other similar air-ride axle/suspension system. However, air spring 224 is typically utilized without shock absorber 40. Air spring 224 includes a bellows 241 and a piston 242. The top end of bellows 241 is sealingly engaged with a bellows top plate 243 in a manner well known in the art. An air spring mounting plate (not shown) is mounted on the top surface of top plate 243 by fasteners (not shown) which are also used to mount the top portion of air spring 224 to a respective one of the main members (not shown) of the vehicle. Alternatively, bellows top plate 243 could also be mounted directly on a respective one of the main members (not shown) of the vehicle. Piston 242 is generally cylindrical-shaped and includes a continuous generally stepped sidewall 244 attached to a generally flat bottom plate 250 and integrally formed with a top plate 282. Bottom plate 250 is formed with an upwardly-extending central hub 252. Central hub 252 includes a bottom plate 254 formed with a central opening 253. A fastener 251 is disposed through opening 253 in order to attach piston 242 to beam top plate 65 at beam rear end 26 (FIG. 1).

Top plate 282, sidewall 244 and bottom plate 250 of piston 242 define a piston chamber 299 having an interior volume $V_1$. Top plate 282 of piston 242 is formed with a circular upwardly-extending protrusion 283 having a lip 280 around its circumference. Lip 280 cooperates with the lowermost end of bellows 241 to form an airtight seal between the bellows and the lip, as is well known to those of ordinary skill in the art. Bellows 241, top plate 243 and piston top plate 282 define a bellows chamber 298 having an interior volume $V_2$ at standard static ride height. A bumper 281 is rigidly attached to a bumper mounting plate 286 by means generally well known in the art. Bumper mounting plate 286 is in turn mounted on piston top plate 282 by a fastener 284. Bumper 281 extends upwardly from the top surface of bumper mounting plate 286. Bumper 281 serves as a cushion between piston top plate 282 and bellows top plate 243 in order to keep the plates from contacting one another during operation of the vehicle, which can potentially cause damage to the plates.

Bellows chamber 298 preferably has interior volume $V_2$ at standard static ride height of from about 305 in.$^3$ to about 915 in.$^3$. Piston chamber 299 preferably has interior volume $V_1$ at standard static ride height of from about 150 in.$^3$ to about 550 in.$^3$.

Piston top plate 282 is formed with a pair of openings 285, which allow volume $V_1$ of piston chamber 299 and volume $V_2$ of bellows chamber 298 to communicate with one another. More particularly, openings 285 allow fluid or air to pass between piston chamber 299 and bellows chamber 298 during operation of the vehicle. Piston top plate openings 285 preferably have a combined cross-sectional area of from about 0.039 in$^2$ to about 0.13 in$^2$.

The ratio of the cross-sectional area of openings 285 measured in in.$^2$ to the volume of piston chamber 299 measured in in.$^3$ to the volume of bellows chamber 298 measured in in.$^3$ is in the range of ratios of from about 1:600:1200 to about 1:14100:23500.

Having now described the structure of prior art damping air spring 224, the operation of the damping characteristics of the air spring will be described in detail below. When axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 298 is compressed by axle/suspension system 10 as the wheels of the vehicle travel over the curb or the raised bump in the road. The compression of air spring bellows chamber 298 causes the internal pressure of the bellows chamber to increase. Therefore, a pressure differential is created between bellows chamber 298 and piston chamber 299. This pressure differential causes air to flow from bellows chamber 298, through piston top plate openings 285 and into piston chamber 299. The restricted flow of air between bellows chamber 298 into piston chamber 299 through piston top plate openings 285 causes damping to occur. As an additional result of the airflow through openings 285, the pressure differential between bellows chamber 298 and piston chamber 299 is reduced. Air continues to flow through piston top plate openings 285 until the pressures of piston chamber 299 and bellows chamber 298 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 298 is expanded by axle/suspension system 10 as the wheels of the vehicle travel into the hole or depression in the road. The expansion of air spring bellows chamber 298 causes the internal pressure of the bellows chamber to decrease. As a result, a pressure differential is created between bellows chamber 298 and piston chamber 299. This pressure differential causes air to flow from piston chamber 299, through piston top plate openings 285, and into bellows chamber 298. The restricted flow of air through piston top plate openings 285 causes damping to occur. As an additional result of the airflow through openings 285, the pressure differential between bellows chamber 298 and piston chamber 299 is reduced. Air will continue to flow through the piston top plate openings 285 until the pressures of piston chamber 299 and bellows chamber 298 have equalized. When little or no suspension movement has occurred over a period of several seconds the pressure of bellows chamber 298 and piston chamber 299 can be considered equal.

By adjusting the relative sizes of volume $V_1$ of piston chamber 299, volume $V_2$ of bellows chamber 298, and/or piston top plate openings 285, it is possible to tune the level of damping that is achieved as well as the frequency at which the highest level of damping occurs. The level of damping achieved is measured by the energy that is lost through damping over one cycle or oscillation. For example, a relatively smaller bellows chamber volume $V_2$, will generally produce a higher level of damping, as the pressure change within bellows chamber 298 will be higher for a given event, i.e., a higher pressure differential means more flow through piston top plate openings 285, thereby resulting in more damping. By further example, a relatively larger piston chamber volume $V_1$, will also generally produce a higher level of damping, as the pressure differential between piston chamber 299 and bellows chamber 298 will generally take longer to equalize, i.e., more air will need to flow through piston top plate openings 285 resulting in more damping between the piston chamber and the bellows chamber. By further example, changing the relative cross-sectional size, shape, number or even the length of piston top plate openings 285, will in turn affect the time it takes for the pressures in piston chamber 299 and bellows chamber 298 to equalize. Therefore, the cross-sectional size of piston top plate openings 285 can be altered to both vary the level of damping and the frequency at which the highest level of damping occurs.

Turning now to FIG. 5, the relative level of damping per cycle over a critical range of frequencies of axle/suspension system 10 incorporating prior art damping air spring 224 without shock absorber 40 is shown. As can be seen in FIG. 5, the combination of axle/suspension system 10 with damping air spring 224 without shock absorber 40 shows maximum damping at B around the 1.5-4.0 Hz range. As the frequency of the inputs on axle/suspension system 10 increases, the relative damping provided by damping air spring 224 begins to decline as shown at C. This is because damping air spring 224 provides less damping at frequencies above about 6.0 Hz. Such reduced damping at higher frequencies can potentially cause tire wear and payload damage.

More specifically, prior art air springs 224 with damping features may potentially provide less than optimal damping at critical higher frequencies D, such as about 13.0 Hz, which can in turn potentially cause reduced life of the components of the axle/suspension system, including potentially increased tire wear and payload damage.

Prior art shock absorbers 40, such as those of the type shown in FIGS. 1 and 2 have a continuously increasing damping curve at higher critical frequencies I, around about 13.0 Hz.

This means that as the frequency of the inputs on axle/suspension system 10 increase, the damping provided by shock absorber 40 to the axle/suspension system is increased. This increased damping of shock absorber 40 at higher input frequencies causes increased transmissibility of the forces acting on axle/suspension system 10, which in turn can reduce the soft ride characteristics of the axle/suspension system at higher frequencies and can also lead to premature wear and reduced life of the components of the axle/suspension system, tires and other components of the vehicle. Because prior art shock absorber 40 exhibits a continuously increasing damping curve, when the shock absorber encounters high energy inputs, "misting" of the shock absorber as described above can occur which can result in the potential need for premature replacement of the shock absorbers or other components and may potentially cause contamination of surrounding components. The combination damping air spring and shock absorber of the present invention, overcomes these problems and the advantages and benefits of the invention will be described in detail below.

A first preferred embodiment combination damping air spring and shock absorber 300 is shown generally in FIGS. 6 and 7 and will be described in detail below. Damping air spring 324 is generally identical to prior art air spring 224 with damping features described in detail above, and its placement on axle/suspension system 10 is also generally identical. Optimized shock absorber 340 is similar in some respects to prior art shock absorber 40 described in detail above, in that the placement of shock absorber 340 on axle/suspension system 10 is generally identical to the placement of prior art shock absorber 40 described in detail above. However, optimized shock absorber 340 is smaller and less costly to manufacture than prior art shock absorber 40 and utilizes mounting hardware having a reduced size, thus saving weight.

Turning now to FIG. 7, optimized shock absorber 340 is shown removed from axle/suspension system 10. Optimized shock absorber 340 includes an upper inverted cup portion 316 that is slip fit over a cylinder 318. An eyelet 309 including a bushing assembly 308 is mounted on the lowermost end of the shock absorber cylinder 318 and also on the uppermost end of inverted cup portion 316. More specifically, bushing assembly 308 includes an outer generally cylindrical carrier 310 formed from metal or other sufficiently rigid material. A bushing 312 formed with a continuous opening 313 at its center is press fit into cylindrical carrier 310. An inner sleeve 314 having a generally cylindrical shape and formed with a continuous opening 315 at its center is press fit into opening 313 of bushing 312. Inner sleeve 314 extends generally outwardly past bushing 312 and carrier 310. Carrier 310 is fixedly attached to the uppermost end of a plunger 326 via welds or other similar means of rigid attachment. Cylinder 318 includes a chamber 319, which is filled with fluid 325. Chamber 319 also includes a generally circular flat diaphragm 320 formed with a pair of openings 322 that allow communication of fluid through the diaphragm and within or throughout the entire chamber. The uppermost surface of diaphragm 320 is attached to plunger 326. Plunger 326 extends from diaphragm 320, through chamber 319 and fluid 325, through an opening 331 formed in the uppermost portion of cylinder 318, and is attached to inverted cup 316 and carrier 310. As inverted cup portion 316 slides downwardly over cylinder 318 of optimized shock absorber 340 during operation of the vehicle, plunger 326 moves diaphragm 320 downwardly in direction D. Conversely, as inverted cup portion 316 slides upwardly over lower portion 318 of optimized shock absorber 340 during operation of the vehicle, plunger 326 moves diaphragm 320 upwardly in direction U. The upward and downward movement of diaphragm 320 through fluid 325 provides viscous damping to shock absorber 340 and in turn the axle/suspension system to which it is attached during operation of the heavy-duty vehicle.

The primary difference between optimized shock absorber 340 of the present invention and prior art shock absorber 40 is that the optimized shock absorber includes an optimized blow off valve 333 and as a result generates reduced damping across all frequencies. In addition, the mount of eyelet 309 to the uppermost end of inverted cup portion 316 and the lowermost portion of shock absorber cylinder 318 is less robust, which saves weight. The less robust mount is sufficient because of the reduced damping required by the shock absorber because it is being used in combination with damping air spring 324.

Turning now to FIG. 8, the relative level of damping per cycle over a critical range of frequencies of an axle/suspension system incorporating first preferred embodiment combination damping air spring and shock absorber 300 of the present invention is shown. As can be seen in FIG. 8, combination damping air spring and shock absorber 300 of the present invention provides optimal damping to the axle/suspension system throughout the entire range of critical natural frequencies of the axle/suspension system from about 1.8 Hz E to about 13.0 Hz F, and also across the entire range of frequencies, mainly from about 0.0 Hz to about 14.0 Hz. More specifically, damping air spring 324 primarily provides optimal damping to axle/suspension system 10 at lower frequencies below about 6 Hz, while optimized shock absorber 340 primarily provides optimal damping to the axle/suspension system at higher frequencies above about 6 Hz. Combination damping air spring and shock absorber 300 of the present invention provides optimal damping across the entire range of frequencies including all critical ranges of frequencies that include body bounce mode, 1.8 Hz, and wheel hop mode, 13.0 Hz for a trailer.

Combination damping air spring and shock absorber 300 of the present invention, overcomes the problems associated with prior art damping air springs 224 and prior art shock absorbers 40 utilized with non-damping air springs 24, by providing damping air spring 324 that is utilized in combination with optimized shock absorber 340 resulting in optimized damping characteristics for axle/suspension system 10 across the entire spectrum of critical input frequencies. Combination damping air spring and shock absorber 300 for heavy-duty vehicles of the present invention allows tuning of certain structural components of shock absorber 340 to provide optimal damping at higher frequencies, resulting in improved damping to axle/suspension system 10 while reducing transmissibility and misting that are common in prior art standard shock absorbers 40, potentially saving weight and cost, and allowing the heavy-duty vehicle to haul more cargo. Moreover, reducing transmissibility of road inputs into the components of axle/suspension system 10 during operation of the vehicle increases the durability of the axle/suspension system and the components of the axle/suspension system while maintaining soft ride characteristics of the axle/suspension system at higher critical input frequencies.

Turning now to FIG. 9, a second preferred embodiment combination damping air spring and shock absorber 400 is shown generally in FIG. 9 and will be described in detail below. Damping air spring 424 is generally identical to prior art air spring 224 with the damping features described in detail above, and its placement on axle/suspension system 10 is also generally identical. Shock absorber 440 is generally identical to prior art shock absorber 40 described in detail above, and placement of shock absorber 440 on axle/suspension system 10 is also generally identical to the placement of prior art shock absorber 40 described in detail above.

In recent years, certain jurisdictions have implemented "road friendly" legislation. In those jurisdictions, government regulations require extremely high levels of damping for vehicles traveling on roads within the jurisdiction. Typically, this increased damping has been accomplished by using shock absorbers that are "extra-duty" and that provide the required minimum threshold of damping. These shock absorbers require heavy/robust mounting structures which are costly.

Second preferred embodiment combination damping air spring and shock absorber 400 of the present invention accomplishes the increased levels of damping through the utilization of a combination of a damping air spring 424 and a shock absorber 440.

Turning now to FIG. 10, the relative level of damping per cycle over a critical range of frequencies of an axle/suspension system incorporating second preferred embodiment combination damping air spring and shock absorber 400 of the present invention is shown. As can be seen by FIG. 10, combination damping air spring and shock absorber 400 of the present invention provides increased levels of damping to the axle/suspension system at both critical natural frequencies of the axle/suspension system, 1.8 Hz G and 13.0 Hz H. Such increased damping allows second preferred embodiment combination damping air spring and shock absorber 400 of the present invention to provide damping that is compliant with "road friendly" jurisdictions, without the need for implementing "extra-duty" shock absorbers that are heavy and that require heavy/robust mounting structures.

Thus, utilization of second preferred embodiment combination damping air spring and shock absorber 400 of the present invention saves weight which in turn allows vehicles utilizing the invention to carry more cargo.

Turning now to FIG. 11, the relative level of damping per cycle over a critical range of frequencies of the various axle/suspension systems shown in the graphs in FIGS. 4, 5, 8 and 10 are shown in comparison with one another.

It is contemplated that first and second preferred embodiment combination damping air spring and shock absorber 300,400 of the present invention could be utilized on tractor-trailers or other heavy-duty vehicles, including trucks, specifically class-8 commercial trucks, or buses and the like having one or more than one axle, without changing the overall concept or operation of the present invention. It is further contemplated that preferred embodiment combination damping air spring and shock absorber 300,400 of the present invention could be utilized on vehicles having frames or subframes which are moveable or non-movable without changing the overall concept of the present invention. It is yet even further contemplated that preferred embodiment combination damping air spring and shock absorber 300,400 of the present invention could be utilized on all types of air-ride leading and/or trailing arm beam-type axle/suspension system designs known to those skilled in the art without changing the overall concept or operation of the present invention. For example, the present invention finds application in beams or arms that are made of materials other than steel, such as aluminum, other metals, metal alloys, composites, and/or combinations thereof. It is also contemplated that preferred embodiment combination damping air spring and shock absorber 300,400 of the present invention could be utilized on axle/suspension systems having either an overslung/top-mount configuration or an underslung/bottom-mount configuration, without changing the overall concept of the present invention. The present invention also finds application in beams or arms with different designs and/or configurations than that shown above, such as solid beams, shell-type beams, truss structures, intersecting plates, spring beams and parallel plates. The present invention also finds application in intermediary structures such as spring seats. It is also contemplated that preferred embodiment combination damping air spring and shock absorber 300,400 of the present invention could be utilized in conjunction with other types of air-ride rigid beam-type axle/suspension systems such as those using U-bolts, U-bolt brackets/axle seats and the like, without changing the overall concept or operation of the present invention. It is also contemplated that preferred embodiment combination damping air spring and shock absorber 300,400 of the present invention could be formed from various materials, including but not limited to composites, metal and the like, without changing the overall concept or operation of the present invention. It is also contemplated that preferred embodiment combination damping air spring and shock absorber 300,400 of the present invention could be utilized with any fluid, such as air or hydraulic fluid, without changing the overall concept of the present invention. It should also be understood that preferred embodiment combination damping air spring and shock absorber 300,400 of the present invention could be modified to be utilized on busses where the critical body bounce mode is 1.5 Hz and wheel hop mode is 11.0 Hz without changing the overall concept or operation of the present invention. It is even further contemplated that damping air springs 324,424 utilized in preferred embodiment combination damping air spring and shock absorber 300,400, respectively, could be connected via conduit(s) to an external reservoir instead of the reservoir contained in piston chamber 299, without changing the overall concept or operation of the present invention. It should also be understood that different types of axle/suspension systems may exhibit different critical natural frequencies for body bounce mode and wheel hop mode and the teachings herein are applicable thereto. It is contemplated that preferred embodiment combination damping air spring and shock absorber 300 of the present invention could be utilized with a shock absorber that does not include a blow off valve, without changing the overall concept or operation of the present invention. It is also contemplated that damping air springs 324,424 utilized in preferred embodiment combination damping air spring and shock absorber 300,400, respectively, could be different types of damping air springs having different structures and make-ups, without changing the overall concept or operation of the present invention.

Accordingly, the damping air spring and shock absorber combination for heavy-duty vehicle axle/suspension systems is simplified, provides an effective, safe, inexpensive and efficient structure and method which achieves all the enumerated objectives, provides for eliminating difficulties encountered with prior art air springs and shock absorbers, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the damping air spring and shock absorber combination for heavy-duty vehicle axle/suspension systems is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A damping air spring and shock absorber combination for heavy-duty vehicle axle/suspension systems comprising:
a damping air spring operatively attached to said axle/suspension system, and
shock absorber means operatively attached to said axle/suspension system, said shock absorber means being separate from said damping air spring, said damping air spring primarily providing damping to the axle/suspension system over a first critical range of frequencies and said shock absorber means primarily providing damping to the axle/suspension system over a second range of critical frequencies, said first range of critical frequencies and said second range of critical frequencies being different from one another, whereby the shock absorber means optimizes said damping over the first and second ranges of critical frequencies.

2. The damping air spring and shock absorber combination for heavy-duty vehicle axle/suspension systems of claim 1, wherein said first critical range of frequencies is from about 0.0 Hz to about 6.0 Hz.

3. The damping air spring and shock absorber combination for heavy-duty vehicle axle/suspension systems of claim 1, wherein said second range of critical frequencies is from about 0.0 Hz to about 13 Hz.

4. The damping air spring and shock absorber combination for heavy-duty vehicle axle/suspension systems of claim 1, wherein said second range of critical frequencies is greater than about 6.0 Hz.

5. The damping air spring and shock absorber combination for heavy-duty vehicle axle/suspension systems of claim 4, said piston chamber comprising an external reservoir located outside of said air spring.

6. The damping air spring and shock absorber combination for heavy-duty vehicle axle/suspension systems of claim 4, said piston chamber being located within a piston of said air spring.

7. The damping air spring and shock absorber combination for heavy-duty vehicle axle/suspension systems of claim 4, said at least one opening having a cross-sectional area of from about 0.039 in.$^2$ to about 0.13 in.$^2$.

8. The damping air spring and shock absorber combination for heavy-duty vehicle axle/suspension systems of claim 7, wherein the ratio of a cross-sectional area of said at least one opening measured in in.$^2$ to the volume of said piston chamber measured in in.$^3$ to a volume of said bellows chamber measured in in.$^3$ is in the range of ratios of from about 1:600:1200 to about 1:14100:23500.

9. The damping air spring and shock absorber combination for heavy-duty vehicle axle/suspension systems of claim 4, said piston chamber having a volume of from about 150 in.$^3$ to about 550 in.$^3$.

10. The damping air spring and shock absorber combination for heavy-duty vehicle axle/suspension systems of claim 4, said bellows chamber having a volume of from about 305 in.$^3$ to about 915 in.$^3$.

11. The damping air spring and shock absorber combination for heavy-duty vehicle axle/suspension systems of claim 1, said shock absorber means including a blow off valve that generates reduced damping across all frequencies.

12. The damping air spring and shock absorber combination for heavy-duty vehicle axle/suspension systems of claim 1, said damping air spring further comprising a bellows chamber and a piston chamber, said bellows chamber being in fluid communication with said piston chamber via at least one opening.

13. A method for providing damping for heavy-duty vehicle axle/suspension systems comprising:

providing a damping air spring operatively attached to a heavy-duty vehicle axle/suspension system, and providing shock absorber means operatively attached to said axle/suspension system, said shock absorber means being separate from said damping air spring, said damping air spring primarily providing damping to the axle/suspension system over a first critical range of frequencies and said shock absorber means primarily providing damping to the axle/suspension system over a second range of critical frequencies, said first range of critical frequencies and said second range of critical frequencies being different from one another, whereby the shock absorber means optimizes said damping over the first and second ranges of critical frequencies.

* * * * *

UNITED STATES PATENT AND TRADEMARK OFFICE
CERTIFICATE OF CORRECTION

PATENT NO. : 9,744,824 B2
APPLICATION NO. : 15/080799
DATED : August 29, 2017
INVENTOR(S) : R. Scott Fulton et al.

It is certified that error appears in the above-identified patent and that said Letters Patent is hereby corrected as shown below:

Delete Claims 1-13 at Column 16, Line 46 through Column 18, Line 29, and insert:
--1. A damping air spring and shock absorber combination for heavy-duty vehicle axle/suspension systems comprising:
    a damping air spring operatively attached to said axle/suspension system, and
    shock absorber means operatively attached to said axle/suspension system, said shock absorber means being separate from said damping air spring, said damping air spring primarily providing damping to the axle/suspension system over a first critical range of frequencies and said shock absorber means primarily providing damping to the axle/suspension system over a second range of critical frequencies, said first range of critical frequencies and said second range of critical frequencies being different from one another, whereby the shock absorber means optimizes said damping over the first and second ranges of critical frequencies.

2. The damping air spring and shock absorber combination for heavy-duty vehicle axle/suspension systems of claim 1, wherein said first critical range of frequencies is from about 0.0 Hz to about 6.0 Hz.

3. The damping air spring and shock absorber combination for heavy-duty vehicle axle/suspension systems of claim 1, wherein said second range of critical frequencies is from about 0.0 Hz to about 13 Hz.

4. The damping air spring and shock absorber combination for heavy-duty vehicle axle/suspension systems of claim 1, said damping air spring further comprising a bellows chamber and a piston chamber, said bellows chamber being in fluid communication with said piston chamber via at least one opening.

5. The damping air spring and shock absorber combination for heavy-duty vehicle axle/suspension systems of claim 4, said piston chamber comprising an external reservoir located outside of said air spring.

Signed and Sealed this
Seventh Day of January, 2020

Andrei Iancu
*Director of the United States Patent and Trademark Office*

6. The damping air spring and shock absorber combination for heavy-duty vehicle axle/suspension systems of claim 4, said piston chamber being located within a piston of said air spring.

7. The damping air spring and shock absorber combination for heavy-duty vehicle axle/suspension systems of claim 4, said at least one opening having a cross-sectional area of from about 0.039 in.$^2$ to about 0.13 in.$^2$.

8. The damping air spring and shock absorber combination for heavy-duty vehicle axle/suspension systems of claim 7, wherein the ratio of a cross-sectional area of said at least one opening measured in in.$^2$ to the volume of said piston chamber measured in in.$^3$ to a volume of said bellows chamber measured in in.$^3$ is in the range of ratios of from about 1:600:1200 to about 1:14100:23500.

9. The damping air spring and shock absorber combination for heavy-duty vehicle axle/suspension systems of claim 4, said piston chamber having a volume of from about 150 in.$^3$ to about 550 in.$^3$.

10. The damping air spring and shock absorber combination for heavy-duty vehicle axle/suspension systems of claim 4, said bellows chamber having a volume of from about 305 in.$^3$ to about 915 in.$^3$.

11. The damping air spring and shock absorber combination for heavy-duty vehicle axle/suspension systems of Claim 1, said shock absorber means including a blow off valve that generates reduced damping across all frequencies.

12. The damping air spring and shock absorber combination for heavy-duty vehicle axle/suspension systems of claim 1, wherein said second range of critical frequencies is greater than about 6.0 Hz.

13. A method for providing damping for heavy-duty vehicle axle/suspension systems comprising:
    providing a damping air spring operatively attached to a heavy-duty vehicle axle/suspension system, and
    providing shock absorber means operatively attached to said axle/suspension system, said shock absorber means being separate from said damping air spring, said damping air spring primarily providing damping to the axle/suspension system over a first critical range of frequencies and said shock absorber means primarily providing damping to the axle/suspension system over a second range of critical frequencies, said first range of critical frequencies and said second range of critical frequencies being different from one another, whereby the shock absorber means optimizes said damping over the first and second ranges of critical frequencies.--